US012779748B2

(12) United States Patent
Huynh et al.

(10) Patent No.: US 12,779,748 B2
(45) Date of Patent: Nov. 3, 2026

(54) METHOD AND INJECTION MOLDING TOOL FOR PRODUCING A COMPONENT COMPOSITE

(71) Applicant: Bayerische Motoren Werke Aktiengesellschaft, Munich (DE)

(72) Inventors: Dienhung Huynh, Landshut (DE); Richard Schwimmbeck, Adlkofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 64 days.

(21) Appl. No.: 18/843,742

(22) PCT Filed: Feb. 8, 2023

(86) PCT No.: PCT/EP2023/053043
§ 371 (c)(1),
(2) Date: Sep. 4, 2024

(87) PCT Pub. No.: WO2023/169760
PCT Pub. Date: Sep. 14, 2023

(65) Prior Publication Data

US 2025/0178252 A1 Jun. 5, 2025

(30) Foreign Application Priority Data

Mar. 9, 2022 (DE) ..................... 10 2022 105 501.9

(51) Int. Cl.
*B29C 44/42* (2006.01)
*B29C 44/14* (2006.01)
*B29L 31/30* (2006.01)

(52) U.S. Cl.
CPC .............. *B29C 44/14* (2013.01); *B29C 44/42* (2013.01); *B29L 2031/3005* (2013.01)

(58) Field of Classification Search
None
See application file for complete search history.

(56) References Cited

U.S. PATENT DOCUMENTS 3,767,742 A * 10/1973 Robin ................. B29C 44/0461
264/DIG. 83
6,146,564 A 11/2000 Beckmann
(Continued)

FOREIGN PATENT DOCUMENTS

DE 43 36 550 A1 5/1995
DE 43 42 729 A1 6/1995
(Continued)

OTHER PUBLICATIONS

International Search Report (PCT/ISA/210) issued in PCT Application No. PCT/EP2023/053043 dated May 9, 2023 with English translation (6 pages).
(Continued)

*Primary Examiner* — Mohammad M Ameen
(74) *Attorney, Agent, or Firm* — Crowell & Moring LLP

(57) ABSTRACT

A method for producing a component composite for a vehicle includes providing a translucent film with a film outer side and a film inner side and providing an injection molding die with an injection body and a mold body. The method further includes positioning the injection body in an injection position spaced apart from the film inner side, positioning the mold body on the film inner side, and injection molding a foaming carrier material onto the film inner side in order to form a carrier which is connected in an integrally joined manner to the film inner side. After the injection molding, the injection body is moved out of the injection position away from the film inner side into a final
(Continued)

molding position and the mold body is left positioned on the film inner side in order to form a material void in the foaming carrier material.

7 Claims, 3 Drawing Sheets

(56) References Cited

U.S. PATENT DOCUMENTS

| | | | | |
|---|---|---|---|---|
| 2008/0130305 | A1 * | 6/2008 | Wang ..................... | B60Q 3/252<br>362/492 |
| 2020/0031034 | A1 | 1/2020 | Hattensperger et al. | |

FOREIGN PATENT DOCUMENTS

| | | | |
|---|---|---|---|
| DE | 10 2008 017 508 | A1 | 10/2009 |
| DE | 10 2014 208 421 | A1 | 11/2015 |
| DE | 10 2017 206 090 | A1 | 10/2018 |
| JP | 60-72712 | A | 4/1985 |
| JP | 6-15672 | A | 1/1994 |
| JP | 11-156881 | A | 6/1999 |
| JP | 11-240023 | A | 9/1999 |
| WO | WO 2010/130300 | A1 | 11/2010 |
| WO | WO 2014/016222 | A1 | 1/2014 |

OTHER PUBLICATIONS

German-language Written Opinion (PCT/ISA/237) issued in PCT Application No. PCT/EP2023/053043 dated May 9, 2023 with English translation (10 pages).

German-language German Search Report issued in German Application No. 10 2022 105 501.9 dated Jul. 5, 2022 with partial English translation (10 pages).

* cited by examiner

METHOD AND INJECTION MOLDING TOOL FOR PRODUCING A COMPONENT COMPOSITE

BACKGROUND AND SUMMARY

The present invention relates to a method and an injection molding die for producing a component composite.

In modern vehicle interiors, light apertures with decorative or informative functions are found. Light apertures consist of a carrier which has material voids at defined locations, with the result that the carrier is permeable for light at these locations. These locations have a defined shape, with the result that the light apertures are clearly contoured.

Customary carriers are manufactured using the injection molding method from a plastic such as polypropylene. Here, a transparent film is inserted into the die, behind or onto which film the plastic is injected. The die is shaped in such a way that defined locations which subsequently form the light apertures remain free.

It has been shown in practice that a loss of the dimensional accuracy can occur in the case of the material shrinkage of the carrier material on account of the bimetal effect which describes the deformation of a composite component with materials with different coefficients of thermal expansion. That is to say, the different behavior of the film and the carrier can lead to an undesired deformation of the finished component composite. Furthermore, the local deformation can be assisted by the fact that ribs are frequently configured on the carrier, which have a particularly large quantity of material in comparison with other component portions and, as a result, lead to a correspondingly inhomogeneous shrinkage behavior. As a result, visible sink marks arise on the surface of the finished component composite, in particular in the region of the film. The manufacture of a component composite of the generic type using a pure injection molding method is accordingly problematic.

An attempt has then been made to take account of this problem by way of the use of a foaming carrier material. However new difficulties have resulted from this. The expanding carrier material does not exactly follow the opening cavity of the injection molding die, and therefore cannot exactly reproduce the predefined contour. That is to say, the expanding carrier material cannot penetrate into acute angles of the injection molding die on account of its low foaming pressure, for example. Contours with angles of this type therefore cannot be reproduced exactly. In this case, the carrier material can assume a radius which only approximates the desired angle. Moreover, a deformation of the film can occur, furthermore, on account of an adhesive action of the foaming carrier material on the film in the region of the radii.

It is an object of the present invention to at least partially take account of the above-described problem. In particular, it is an object of the present invention to provide a component composite with a translucent film and a solid body which holds the film without undesired material deformations in a simple way.

The above object is achieved by way of the patent claims. Further advantages of the invention result from the dependent claims, the description and the figures. Here, it goes without saying that features which are described in conjunction with the method also apply in conjunction with the injection molding die according to the invention, and vice versa in each case, with the result that reference is and/or can be always made mutually with regard to the disclosure in respect of the individual aspects of the invention.

In accordance with a first aspect of the present invention, a method for producing a component composite for a vehicle is provided. The method comprises the following steps:

- providing a translucent film with a film outer side and a film inner side,
- providing an injection molding die with an injection body and a mold body, it being possible for the injection body and the mold body to be moved relative to one another,
- positioning the injection body in an injection position spaced apart from the film inner side,
- positioning the mold body on the film inner side,
- injection molding a foaming carrier material onto the film inner side in order to form a carrier which is connected in an integrally joined manner to the film inner side, and,
- after the injection molding, moving the injection body out of the injection position away from the film inner side into a final molding position, the mold body remaining positioned on the film inner side in order to form at least one material void in the carrier material.

Using the mold body, the film is held in the desired position during the extended injection molding method. Moreover, the mold body is used as a placeholder for producing the desired material void in the carrier. In combination with the foaming carrier material and the injection body which moves relative to the mold body, stress-free production of the component composite can then be realized, even in the region of the material voids. It can be ensured, in particular, that the carrier material can penetrate as far as into the corners of the injection molding die, without an undesired deformation subsequently having to be feared in this region, for example a curvature and/or a sink mark of the film.

The foam pressure of the foaming carrier material ensures additional holding pressure during the entire cooling time for the component composite. As a result, the stresses which otherwise occur on account of thermal expansion and/or shrinkage can be considerably reduced. By way of the provided method, material voids for light apertures with relatively complex contours can be produced. As a result of the use of the foaming carrier material, a component composite can be produced which has a relatively low weight in comparison with a component composite made from conventional solid material. The final local density of the carrier material can be controlled by way of the shape and the movement of the mold body. That is to say, the mold body can ensure in relevant regions that the plastic remains locally compact, as a result of which the production of sink marks is prevented. For this purpose, the mold body can be shaped and/or moved in such a way that no room or only a small amount of room is left for foaming of the carrier material in the regions on and/or close to the transparent film. The mold body can be adjusted by way of an adjusting means in order to change the spacing between the mold body and the film inner side, in order to set the density of the carrier material during the foaming of the carrier material to the desired or a predefined value. In particular, the mold body can be adjusted hydraulically by means of a hydraulic system. Here, the mold body can be moved relative to the injection body.

As foaming carrier material, in particular, an integral foam can be used. The film can be understood to be a flexible and elastically deformable flat structure. The injection body preferably carries out a linear movement when it is moved from the injection position into the final molding position. The mold body can be understood to be a construction consisting of a plurality of mold body elements. The mold body elements can be configured such that they are spaced apart from one another and/or can be moved relative to one another, and can be moved accordingly in order to produce the component composite. The injection molding die can be understood to be a die for carrying out an injection molding method or a method which comprises an injection molding process. That is to say, the injection molding is not to be considered to be restricted to a pure injection molding method in the present case. The method is preferably carried out as an injection molding-integral foam method. In this way, even particularly complex cavities can be filled reliably with the carrier material.

In accordance with a further embodiment of the present invention, it is possible that, in the case of one method, the injection body is moved into a final molding position, in which the injection body is further away in a range between 50% and 150% from the film inner side than in the injection position. In other words, the injection body can first of all be moved onto the film inner side by a fraction of, for example, 50% of the planned final wall thickness of the carrier and, after the injection of the plastic in the form of the foaming carrier material, can be moved away into the final molding position. The distance of the injection body from the film inner side in the final molding position can therefore correspond to the final wall thickness or at least substantially to the final wall thickness of the carrier at the corresponding location of the carrier. By way of this procedure, the component composite can be produced particularly reliably with the desired shape, in particular without undesired ripples or bulges.

Furthermore, it is possible that, in the case of a method according to the present invention, the mold body loads the film with pressure during the injection molding in order to hold the film in a predefined position. In this way, the desired shape of the carrier and/or the component composite can also be produced in a simple way. A separate holding means and/or an additional holding means can be dispensed with.

In the case of a method according to the invention, moreover, it is possible that the foaming carrier material comprises an agent for releasing carbon dioxide and water. An agent of this type can be understood to be a blowing agent. A blowing agent of this type can comprise carbonate-containing and acid-containing compositions. The use of a corresponding carbonate/acid combination can lead to advantageous foam properties. Preferred agents can comprise, furthermore, citric or tartaric acid, in particular in combination with a metal carbonate. Moreover, chemical blowing agents for releasing $N_2$, CO or $CO_2$ can be used. The method is not restricted to chemical blowing agents, however. Physical blowing agents which are utilized, for example, in the case of thermoplastic manufacturing methods can in principle also be used.

Furthermore, it is possible that, in the case of a method according to the present invention, a laminating layer is applied on the film outer side. Possible unevenness on the film outer side can be laminated by means of the laminating layer. The laminating layer is applied in such a thin layer that a light source on the film inner side can still shine through the laminating layer and can be discerned by a person. That is to say, in particular, the laminating layer covers, preferably completely, the region of the film outer side, on the opposite film inner side of which the at least one material void is configured. The laminating layer is therefore preferably applied as a translucent laminating layer. An LED, for example, can be used as light source for shining through the laminating layer.

In accordance with a further aspect of the present invention, an injection molding die for carrying out a method as described above is provided. The injection molding die comprises an injection body and a mold body, it being possible for the injection body and the mold body to be moved relative to one another, and the mold body being configured to hold the film in a predefined position and to load it correspondingly with pressure to this end while the injection body moves from the injection position into the final position. In this way, the injection molding die according to the invention provides the same advantages as have been described in detail in relation to the method according to the invention.

In the case of an injection molding die according to the invention, it can be advantageous if at least one part of the mold body is of pin-shaped configuration. That is to say, the mold body can comprise one or more pin-shaped or plate-shaped mold body elements, the length of which is multiple times greater than a width and/or a height of the mold body element. The above-described method can be carried out particularly easily and reliably by way of a mold of this type.

DETAILED DESCRIPTION OF THE DRAWINGS

Elements with an identical function and method of operation are provided in each case with the same designations in the figures.

Figure 1:
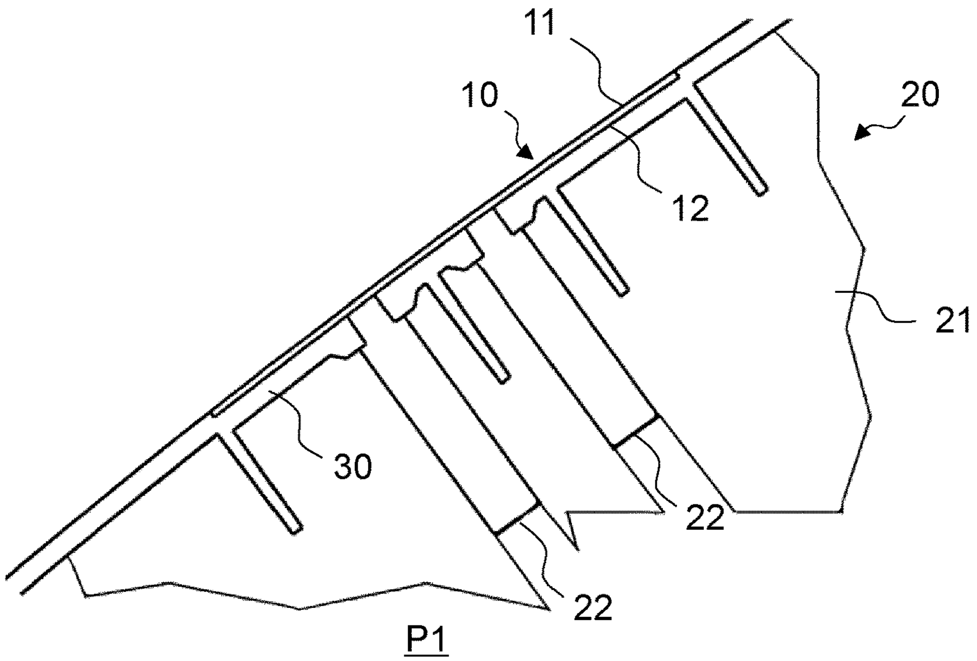
FIG. 1 shows an injection molding die according to the invention in a first operating state.

FIG. 1 shows an injection molding die 20 for carrying out an injection molding-integral foam method, which injection molding die 20 is in a first operating state. The injection molding die 20 comprises an injection body 21 and a mold body 22, it being possible for the injection body 21 and the mold body 22 to be moved relative to one another in order to carry out the method. A film 10 which is translucent or permeable for light beams of a light source is positioned in the injection molding die 20 which is shown. The film 10 has a film outer side 11 and a film inner side 12. FIG. 1 shows the injection body 21 in an injection position P1, in which foaming carrier material 30 has already been injected into a cavity between the film 10 and the injection body 21. The mold body 22 has two plate-shaped mold body elements which are positioned separately from one another and can each be moved relative to the injection body 21.

Figure 2:
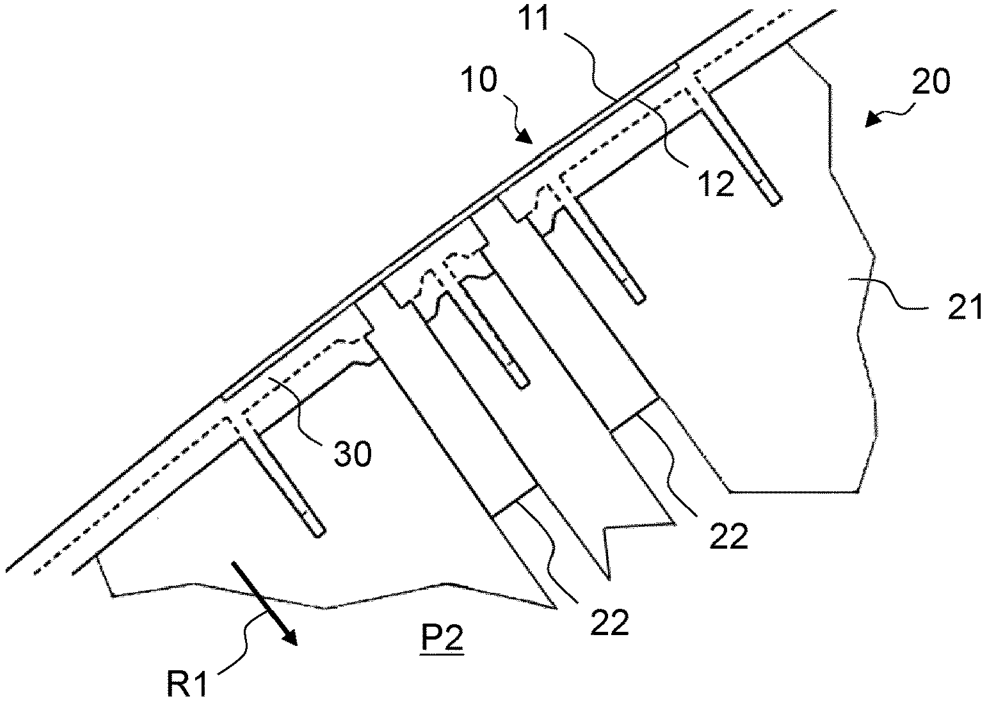
FIG. 2 shows an injection molding die according to the invention in a second operating state.

FIG. 2 shows the injection molding die 20 in a second operating state, in which the injection body 21 is in a final molding position P2 or has been moved from the injection position P1 in a movement direction R1 away from the film 10 into the final molding position P2. In the operating state which is shown in FIG. 2, the carrier material 30 foams in the direction of the injection body 21, the position of which no longer changes. The position of the mold body 22 or the mold body elements on the film 10 remains unchanged, with the result that the mold body 22 holds the film 10 in the desired position during the foaming of the carrier material and forms a placeholder for the desired material voids 40 which are shown in FIG. 4.

Figure 3:
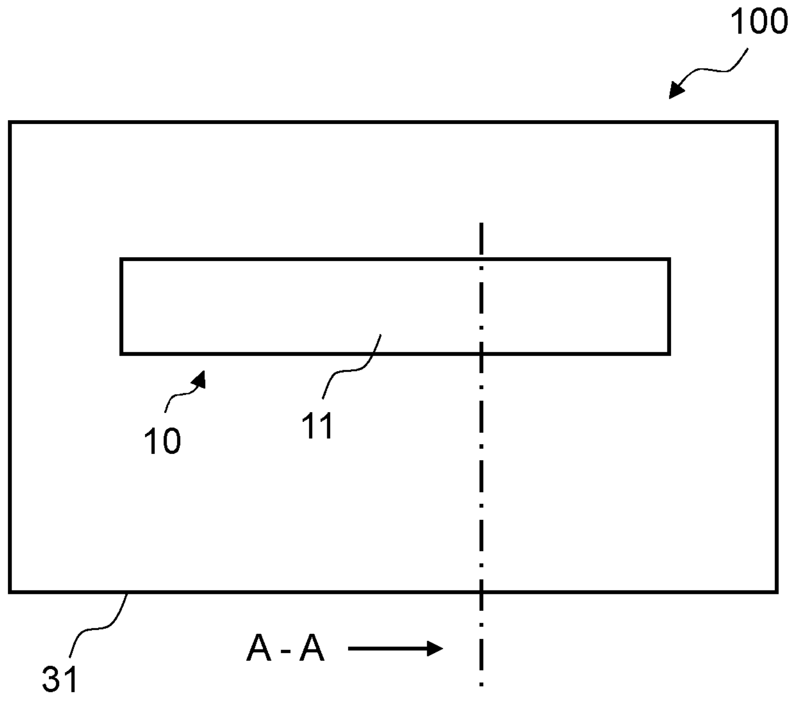
FIG. 3 shows a front view of a component composite which has been produced by way of a method according to the invention.

FIG. 3 shows a front view of a component composite 100 which has been produced by way of the above-described method. The component composite 100 has been produced as an interior component for a motor vehicle. FIG. 4 shows a lateral sectional view of the component composite 100 which has been produced. A laminating layer 50 has also been applied to the component composite 100 which is shown, which laminating layer 50 covers the carrier 31 and the film 10 or the film outer side 11, a translucency for a light source (not shown) still being ensured in the material voids 40.

Figure 4:
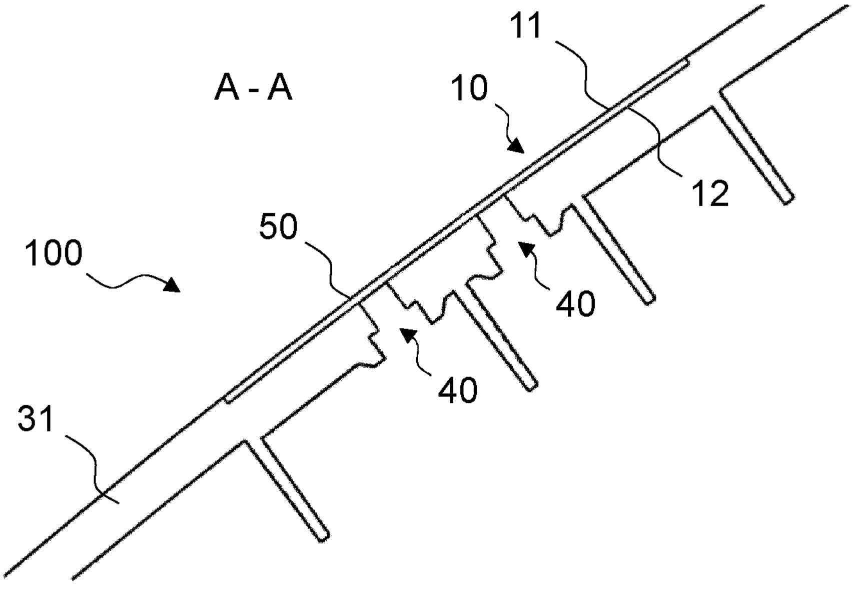
FIG. 4 shows a side view of a component composite which has been produced by way of a method according to the invention.
Figure 5:
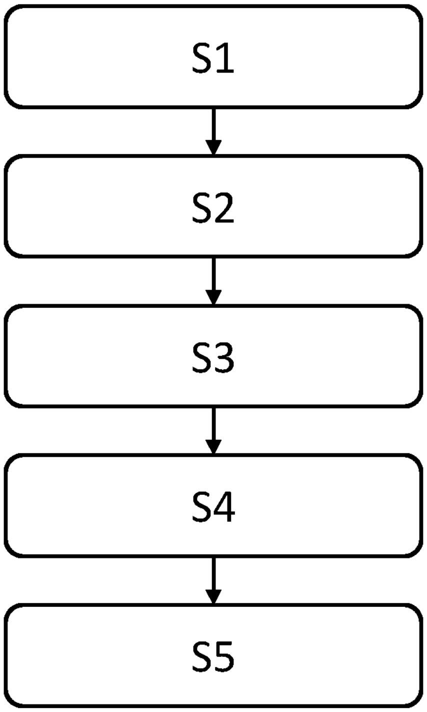
FIG. 5 shows a flow chart for explaining a method according to the invention.

With reference to FIGS. 1, 2 and 5, an injection molding-integral foam method for producing the component composite 100 which is shown in FIGS. 3 and 4 will be explained in the following text. In a first step S1, the translucent film 10 and the injection molding die 20 with the adjustable injection body 21 and the adjustable mold body 22 are provided, and the film 10 is positioned in the injection molding die 20. In a second step S2, the injection body 21 is positioned in an injection position P1 spaced apart from the film inner side 12 while the mold body 22 is pressed onto the film inner side 12. In a third step S3, foaming carrier material 30 is then injected or passed onto the film inner side 11, in order to produce a carrier 31 which is connected in an integrally joined manner to the film inner side 12. The carrier material 30 comprises a blowing agent for releasing carbon dioxide and water. Subsequently, in a fourth step S4, the injection body 21 is moved out of the injection position P1 in the movement direction R1 away from the film inner side 12 into the final molding position P2, while the mold body 22 remains positioned on the film inner side 12 in order to form the at least one material void 40 in the carrier material 30. Here, the injection body 21 is moved into a final molding position P2, in which the injection body 21 is twice as far away from the film inner side 12 than in the injection position P1. In a fifth step S5, the film outer side 11 and the carrier 31 or an outer side of the carrier 31 are laminated around the film outer side 11 with a laminating layer 50.

In addition to the embodiments which are shown, the invention permits further basic design principles. That is to say, the invention should not be considered to be restricted to the exemplary embodiments which are explained in relation to the figures.

LIST OF REFERENCE CHARACTERS

10 Film
11 Film outer side
12 Film inner side
20 Injection molding die
21 Injection body
22 Mold body
30 Carrier material
31 Carrier
40 Material void
50 Laminating layer
P1 Injection position
P2 Final molding position
R1 Movement direction
100 Component composite

The invention claimed is:

1. A method for producing a light aperture for a vehicle, comprising the steps of:
- providing a film with a film outer side and a film inner side, wherein the film is translucent or permeable for light beams of a light source;
- providing an injection molding die with an injection body and a mold body, wherein the injection body and the mold body are movable relative to one another;
- positioning the injection body in an injection position spaced apart from the film inner side;
- positioning the mold body on the film inner side;
- injection molding a foaming carrier material onto the film inner side in order to form a carrier which is connected in an integrally joined manner to the film inner side; and
- after the injection molding, moving the injection body out of the injection position away from the film inner side into a final molding position and leaving the mold body positioned on the film inner side in order to form at least one material void in the foaming carrier material, wherein the at least one material void in the foaming carrier material forms the light aperture such that the foaming carrier material is permeable for the light beams of the light source at the at least one material void.

2. The method according to claim 1, wherein the method is carried out as an injection molding-integral foam method.

3. The method according to claim 1, wherein the final molding position is between 50% and 150% further away from the film inner side than the injection position.

4. The method according to claim 1, wherein the mold body loads the film with pressure during the injection molding in order to hold the film in a predefined position.

5. The method according to claim 1, wherein the foaming carrier material comprises an agent for releasing carbon dioxide and water.

6. The method according to claim 1, further comprising the step of applying a laminating layer on the film outer side.

7. A method for producing a component composite for a vehicle, comprising the steps of:
- providing a translucent film with a film outer side and a film inner side;
- providing an injection molding die with an injection body and a mold body, wherein the injection body and the mold body are movable relative to one another;
- positioning the injection body in an injection position spaced apart from the film inner side;
- positioning the mold body on the film inner side;
- injection molding a foaming carrier material onto the film inner side in order to form a carrier which is connected in an integrally joined manner to the film inner side;
- after the injection molding, moving the injection body out of the injection position away from the film inner side into a final molding position and leaving the mold body positioned on the film inner side in order to form at least one material void in the foaming carrier material; and
- applying a laminating layer on the film outer side.

* * * * *